Feb. 19, 1963  R. S. HINSEY  3,077,848
METHOD OF FORMING A PULL ROD
Original Filed Feb. 7, 1955  2 Sheets-Sheet 2
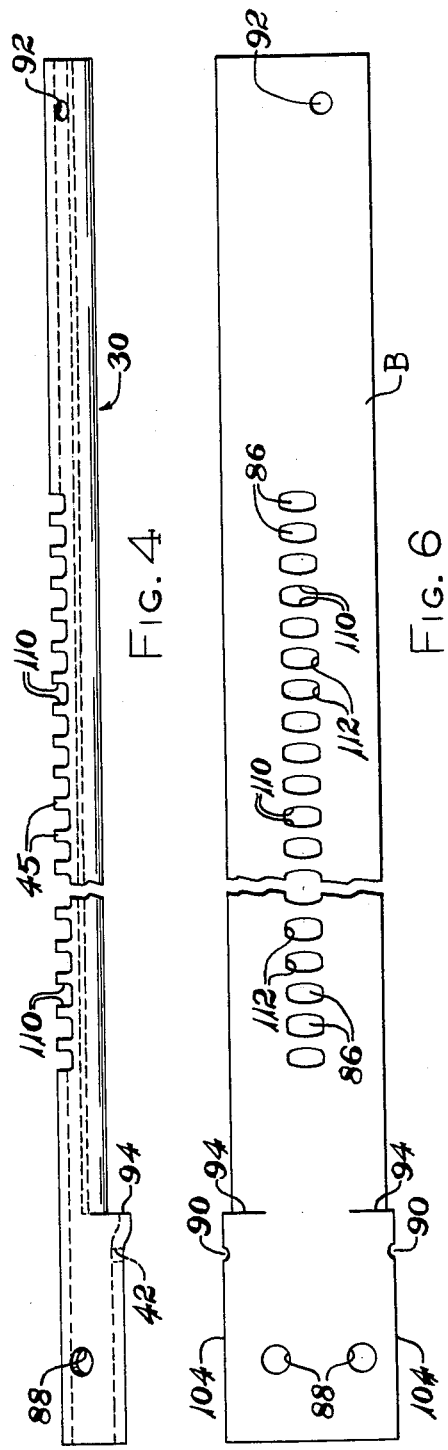
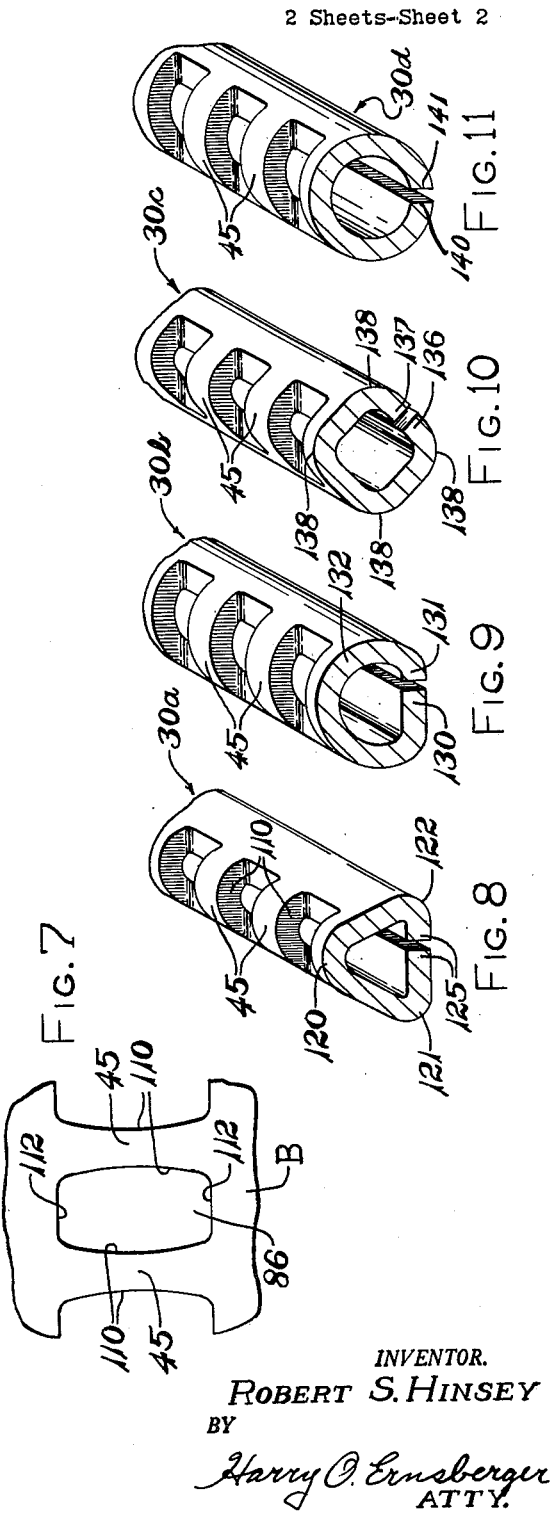
INVENTOR.
ROBERT S. HINSEY
BY
Harry O. Ernsberger
ATTY.

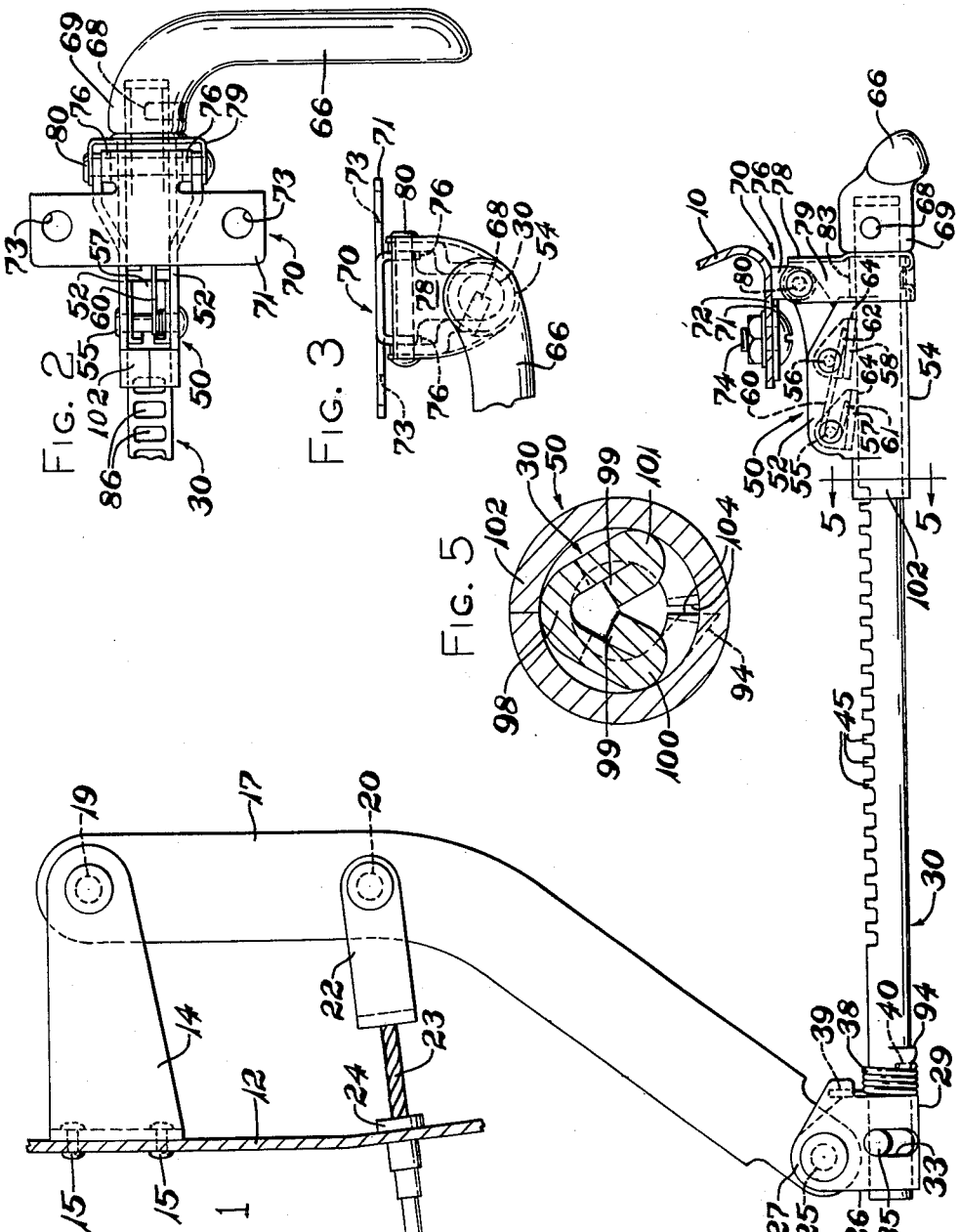

United States Patent Office 3,077,848
Patented Feb. 19, 1963

1

3,077,848
METHOD OF FORMING A PULL ROD
Robert S. Hinsey, Toledo, Ohio, assignor, by mesne assignments, to Universal American Corporation, a corporation of Delaware
Original application Feb. 7, 1955, Ser. No. 486,544, now Patent No. 2,953,037, dated Sept. 20, 1960. Divided and this application Feb. 25, 1960, Ser. No. 10,904
4 Claims. (Cl. 113—116)

This invention relates to mechanism actuating or controlling devices and method of making same, and more especially to a method of making an arrangement adapted for controlling the emergency or parking brakes of an automotive vehicle. This application is a division of my copending application Serial No. 486,544, now Patent No. 2,953,037 granted September 20, 1960.

In the manufacture of automotive vehicles, it has been a practice to employ manually operated means for controlling the operation of the emergency or parking brakes and certain of such mechanisms have embodied manually operated levers, others incorporating a pull rod construction which may be connected by cable means directly or through the medium of one or more levers with the parking brake mechanism of the vehicle. In the latter type of construction, the pull rod member has been formed of a solid rod or a seamless tube in which a series of teeth has been cut or fashioned by machine operations and adapted for cooperation with pawl mechanism for holding the pull rod in longitudinally adjusted position. The constructions embodying solid rods as pull members have been comparatively heavy, and a relatively expensive milling operation is required to fashion the teeth of the rod. In constructions where seamless tubes have been used, not only is the tubing expensive but the teeth must be fashioned in the rod by a milling or machining operation.

Furthermore, in constructions of this character embodying solid rods or seamless tubes the diameter of the rod or tube must be dimensioned accurately in order to be readily slidable in a suitable guide mechanism, yet present a sufficiently snug fit to prevent vibration of the rod or tube which would result in objectionable noise during vehicle operation. Furthermore, any appreciable wear of the rod, tube or guide means in constructions of the above character results in sufficient play or lost motion to set up noises arising from vehicle vibrations.

An object of the invention resides in a method of fabricating a component of a brake-actuating or controlling mechanism which may be inexpensively manufactured and provides an improved construction over devices now in use.

Another object of the invention resides in a method of forming a pull rod component of a brake mechanism wherein a series of teeth for cooperation with pawl or locking means is formed by punching spaced portions from a blank, providing a plurality of spaced, metal portions forming teeth for cooperation with a pawl mechanism.

Another object of the invention resides in a method of forming a pull rod of a mechanism actuating means from a substantially flat blank of sheet metal wherein a series of teeth may be formed by punching a plurality of spaced openings in the blank and forming the blank around a longitudinal axis to present a series of longitudinally aligned teeth or projections adapted for cooperation with a pawl mechanism for holding the rod formed from the blank in adjusted positions.

Another object of the invention resides in forming a hollow, rod-like member from a flat blank or sheet into a cross-sectional configuration adapted to be slidably received in a suitable guide or supporting means wherein the inherent stress in the metal, resulting from forming the blank into a tube, is effective to provide a snug, yet slidable, engagement with the guide member whereby lost motion or looseness between the rod construction and the guide or support member is substantially eliminated or avoided.

Another object of the invention is the provision of a hollow member having a series of projections forming teeth arranged for cooperation with a pawl mechanism, the spaces between adjacent teeth forming means through which foreign matter, dust or the like may be discharged to prevent impairment of the engagement of the pawl means with the teeth.

Another object of the invention embraces a method of making a tubular member having a series of teeth or rack section formed therein which includes punching spaced portions from a substantially flat metal blank forming openings having opposed curved or nonparallel walls and bending the blank to tubular configuration whereby the metal portions between adjacent openings in the blank form rack teeth having substantially parallel walls.

Another object of the invention resides in a method of fashioning a series of projections or teeth in a central zone of a sheet metal blank whereby the projections have adequate integral connection with adjacent zones of the blank whereby liability of breakage of projections or teeth is reduced to a minimum.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view of a form of mechanism actuating or controlling means embodying the invention especially adapted for operating vehicle brake mechanism;

FIGURE 2 is a top plan view of a portion of the construction shown in FIGURE 1;

FIGURE 3 is a view of the righthand end of the construction shown in FIGURE 1;

FIGURE 4 is an elevational view of one form of pull rod or member construction forming a component of the invention;

FIGURE 5 is an enlarged, vertical, sectional view taken substantially on the line 5—5 of FIGURE 1;

FIGURE 6 is a plan view of a sheet metal blank utilized in forming the pull rod component of the construction;

FIGURE 7 is an enlarged, fragmentary, detailed view of a portion of the blank shown in FIGURE 6;

FIGURE 8 is an isometric view illustrating a portion of a pull rod component of modified construction;

FIGURE 9 is an isometric view illustrating another form of pull rod construction of the invention;

FIGURE 10 is an isometric view illustrating a modified, cross-sectional configuration of pull rod construction, and FIGURE 11 is an isometric view illustrating another cross-sectional configuration for the pull rod.

While the mechanism actuating or controlling device of the invention is especially adapted for use in operating or controlling the emergency or parking brakes of an automotive vehicle, it is to be understood that the invention may be utilized with any construction where the same may be found to have utility.

Referring to the drawings in detail and particularly to FIGURES 1 through 5, there are illustrated in FIGURE 1 a portion of a vehicle instrument panel 10 and a portion of a dashboard or firewall 12. Mounted upon the dashboard 12 is a bracket 14 securely fastened to the dashboard by means of rivets 15 or other suitable securing means. A lever 17 is fulcrumed or articulately supported upon bracket 14 by means of a stub shaft or rivet 19. An intermediate zone of the lever 17 is provided with a pin 20 to which is pivotally secured a clevis 22 which straddles lever 17. A flexible cable 23 is anchored at one end to the clevis 22, the cable passing through a suitable grommet 24, preferably formed of rubber, disposed in an opening in the dashborad 12. The cable 23 is adapted to be connected with emergency or parking brake mechanism (not shown) of a vehicle in which the arrangement of the invention may be installed.

Pivotally secured to the lower end of the lever 17 by means of a rivet or shaft 25 is a bracket or coupling member 26, the shaft 25 extending through openings in upwardly extending walls 27 of the bracket. The member 26 is formed with a cylindrical portion 29 to receive and accommodate the end zone of a pull rod or component 30 of the actuating mechanism of the invention.

The wall of the cylindrical portion 29 of the bracket 26 is formed with a slot 33 elongated in a plane normal to the longitudinal axis of the pull rod 30, the slot accommodating the projection portion of a pin 35 driven into or fixedly secured in transverse openings formed in the pull rod 30. The pin-and-slot arrangement provides for limiting rotational movement of the pull rod relative to the bracket 26, the end walls of the slot 33 engaged by the pin 35 serving to define the limits of rotation of the pull rod.

A resilient means is associated with the pull rod 30 and bracket 26 to bias or urge the pull rod toward one direction of rotation. As illustrated in FIGURE 1, this means is inclusive of a coil spring 38, one end 39 thereof being in engagement with a wall of the bracket 26, the other end 40 of the spring projecting into a transverse opening 42 formed in the pull rod 30 and shown in FIGURE 4. As viewed in FIGURE 1, the spring 38 is tensioned to normally bias the pull rod 30 in a clockwise direction of rotation.

The pull rod 30 is formed with a series of projections or teeth 45 adapted for cooperation with pawl mechanism for holding pull rod 30 in adjusted position. The details of the pull rod construction 30 and the method of making same will be hereinafter described in detail. The pull rod 30 is supported by means carried by the instrumental panel 10 of the vehicle construction. The supporting means is inclusive of a member or bracket 50 formed of sheet metal, generall of U shape, having parallel side wall portions 52 and a bight portion 54 of semiannular shape in cross section, forming a trough-like support and guide means for the pull rod 30.

The parallel wall portions 52 are formed with pairs of aligned openings in which are disposed pins or stub shafts 55 and 56, the stub shafts providing pivotal supports for pawls or pawl members 57 and 58. Resilient means is provided for normally urging the pawls into contact or engagement with the exterior surface of the pull rod 30. As shown in FIGURE 1, the resilient means is in the form of a spring member 60 having its ends 61 and 62 in engagement with the pawls 57 and 58, respectively, the intermediate zones of the spring member being coiled about pins or stub shafts 55 and 56. As shown in FIGURE 1, the end zones or edge portions 64 of the pawls normally are disposed in the path of the projections or teeth 45 arranged or aligned longitudinally of the pull rod.

As viewed in FIGURE 1, the righthand end of pull rod 30 is provided with an manipulating grip or handle 66 secured to the pull rod by suitable means, for example, a pin 68, extending transversely through a boss or hub portion 69 of the handle 66 and through an opening 92 in the pull rod 30. The manipulating grip member or handle 66 facilitates manipulation of the pull rod by the vehicle operator.

The U-shaped bracket or pawl housing 50 is arranged to be articulately connected with means secured to the instrument panel 10 to accommodate the varying angular positions of the pull rod occurring by reason of the path of movement of the shaft 25 on lever 17 in an arcuate path during longitudinal movements of the pull rod. As shown in FIGURES 1–3, a member 70 is secured to the instrument panel 10. The member 70 is formed with a flat portion 71 adapted to engage a flange 72 on the instrument panel 10 and is provided with openings 73.

The flange portion 72 of the instrument panel is formed with openings registering with openings 73 in member 70 adapted to receive securing bolts 74 to securely fasten member 70 to the instrument panel. Member 70 is formed with depending or ear portions 76 having openings aligned with openings in the wall portions 52 of the pawl housing 50. An escutcheon member 78 is formed with projecting portions 79 provided with openings aligned with those in the ear portions 76 and side walls of pawl housing 50. A hinge or pivot pin 80 extends through the openings in ear portions 76, walls 52 and portions 79 and serves as an articulate or pivotal connection between the member 70 and the pawl housing 50. The escutcheon member 78 may be welded or otherwise fixedly secured to the pawl housing 50 and occupies the position illustrated in FIGURES 1 through 3.

The bracket 50 is formed with portions 102 and 83 which are formed around the pull rod 30 forming a cylindrical configuration serving as a guide means for the pull rod to assure proper slidable and rotatable movements of the pull rod with respect to the pawl housing or bracket 50. It will be apparent that upon longitudinal movement of pull rod 30, the varying angular positions of the pull rod will be accommodated through the pivotal connection of the pawl housing or bracket 50 with the stationary member 70 through the medium of the hinge pin or shaft 80.

The method of forming the pull rod 30 includes the steps of forming a substantially flat blank to the proper configuration, punching out portions of the blank to provide a series of perforations or openings 86 which are spaced longitudinally of the blank and in aligned relation in a single row and forming other openings therein as hereinafter described. The blank B from which the tube is formed is illustrated in FIGURE 6. The blank is formed with a pair of circular openings 88 at the lefthand zone of the blank as viewed in FIGURE 6. When the blank is bent about a longitudinal axis to provide a pull rod as shown in FIGURE 4, the openings 88 are diametrically disposed and are adapted to receive the pin 35 which cooperates with the slot 33 in the coupling member 26 providing the means for limiting rotation of the pull rod.

The blank is also formed with semicircular notches 90 which, after formation of the pull rod to the configuration shown in FIGURE 4, are brought into registration, forming the opening 42 adapted to receive the end 40 of spring 38. The righthand end zone of the blank as shown in FIGURE 6 is formed with an opening 92 which is adapted to receive the pin 68 for securing the handle member 66 to the pull rod. The blank B is formed with a struck-up portion 94 which provides an abutment in the completely formed pull rod. Upon longitudinal movement of the pull rod toward brake-setting position, the abutment 94 formed by the struck-up portion engages the end of the bracket 50 to limit the longitudinal, slidable movement of the pull rod in a righthand direction as viewed in FIGURE 1.

FIGURE 5 illustrates one cross-sectional configuration or shape of the pull rod formed by bending or forming the blank B about a longitudinal axis. As shown in FIGURE 5, the zone of the pull rod formed with openings 86 providing the projections or teeth 45 becomes a bight portion 98. The edge zone portions 99 of the blank are folded back upon adjacent body portions of the blank, forming the curved portions 100 and 101. FIGURE 5 illustrates the pull rod 30 enclosed within the cylindrical portion 102 of the bracket 50.

The curved exterior zone of the bight portion 98 and the exterior zones of the curved portions 100 and 101 engage the interior cylindrical surface of guide portions 83 and 102. The inherent stress, due to the bending of the metal in forming the pull rod, results in portions 100 and 101 being resiliently biased in an outward direction whereby the zones of engagement or contact of the pull rod with the cylindrical portion 102 are maintained in constant contact, eliminating lost motion or looseness between the portion 102 and the pull rod, thus preventing any noise or rattle of the pull rod during vehicle operation.

The portion of the pull rod contained or journaled in the bracket 26 and embraced by the convolutions of the spring 38 is of cylindrical configuration in cross section, and the edge portions 104 are preferably slightly spaced apart as shown in FIGURE 5. The inherent resiliency of the metal tending to spread the portions of the pull rod results in the cylindrical portion of the pull rod being in close, frictional contact with the interior wall of the bracket 26. This arrangement eliminates or avoids any looseness or lost motion between the pull rod and bracket 26, preventing any rattle or noise.

The bounding walls of the openings 86 in the blank B forming the teeth or projections 45 on the pull rod are specially shaped or configurated so that upon bending or formation of the blank B to the configuration shown in FIGURE 4, the side walls 110 of the projections 45 will be substantially parallel and disposed in planes normal to the longitudinal axis of the pull rod. FIGURE 7 is an enlarged view of a fragmentary portion of the blank B illustrating the shape or configuration of the bounding edges of one of the openings 86. The transversely opposed edge walls 112 of each of the openings 86 are substantially parallel with the longitudinal axis of the pull rod when the blank is formed into the completed configuration. The opposed walls 110 bounding each of the openings 86 are of curved or convex shape or configuration as illustrated in FIGURE 7, imparting a generally oval shape to the opening. The bounding walls 110 in the flat blank B provide portions forming the teeth or projections 45 with central zones of lesser thickness than the zones integrally connecting the projections with the body portion of the blank. The walls 110 of curved shape in the blank shown in FIGURES 6 and 7 are distorted when the blank B is bent or formed into the configuration shown in FIGURES 4 and 5, and due to the pulling or flowing of the metal during the bending operation, the curved walls 110 in the blank B become substantially parallel walls in the finished pull rod as shown in FIGURE 4. Thus, the nonparallel walls 110 formed in the blank B become substantially parallel in the finished pull rod defining the teeth 45, presenting abutment surfaces arranged in planes normal to the longitudinal axis of the pull rod for proper cooperation with the edge wall portions 64 of the pawls 61 and 62.

The completed pull rod 30 formed according to the above-described method is supported by the brackets 26 and 50 in the manner shown in FIGURE 1. Normally the pull rod is resiliently maintained in a relative position of rotation whereby the teeth 45 are aligned with the pawl teeth 64 under the biasing influence of the spring 38. When it is desired to effect a setting of the vehicle brakes, the operator grasps the handle 66 and exerts a pulling force longitudinally of the rod 30 in a righthand direction as viewed in FIGURE 1, causing the rod to slide relative to the bracket 50. The slidable movement of the pull rod 30 causes swinging movement of the lever 17, drawing up the cable 23 to set the vehicle brakes. The pawls 61 and 62 override the projections 45, and one or the other of the pawls engages an adjacent projection 45 to hold the pull rod in brake-setting position.

When the brake mechanism is to be released, the operator grasps the handle 66 and rotates the same in a counterclockwise direction as viewed in FIGURE 3, moving the teeth or projections 45 out of alignment and operative engagement with the pawls 61 and 62. As the pawls engage or contact a smooth or uninterrupted surface of the pull rod, the latter may be moved in a lefthand direction to brake-released position. When the operator releases his grip upon the handle 66, the biasing force or pressure of the spring 38 returns the pull rod to its normal position with the projections 45 in alignment for effective cooperation with the pawls 61 and 62 when the pull rod is again moved to brake-setting position.

FIGURE 8 illustrates a pull rod, embodying the principles of the invention, which is of generally triangular cross-section. The pull rod 30a shown in FIGURE 8 is formed from a blank substantially the same as the blank shown at B in FIGURE 6. The cross-sectional configuration of the pull rod of FIGURE 8 is formed with curved apexes 120, 121 and 122, which are adapted in assembly to engage the cylindrical portion 102 of bracket 50 in the manner that the pull rod 30 engages the same as shown in FIGURE 5. The edges 125 of the blank from which the pull rod 30a is formed are preferably slightly spaced as shown in FIGURE 8, and the inherent stress or resiliency in the metal set up by the bending operation normally biases the apex zones 121 and 122 outwardly to establish frictional contact with the inner wall of the cylindrical portion 102 of the supporting bracket 50. The teeth 45 and the end or edge zones or walls 110 are the same as shown in the construction illustrated in FIGURES 4 and 5.

FIGURE 9 is illustrative of a pull rod 30b which is formed of partially cylindrical configuration in cross-section from a blank the same or similar to that shown in FIGURE 6. In the form shown in FIGURE 9, portions 130 and 131 adjacent the edges of the blank are spaced slightly apart as illustrated, and the inherent resiliency in the cylindrical portion 132 of the pull rod is biased outwardly so as to bring the cylindrical portion of the pull rod in frictional engagement with the inner wall of the cylindrical portion 102 of the bracket 50, serving to prevent lost motion or looseness between the pull rod and the supporting bracket. The teeth 45 of the pull rod 30b are of the same shape as those illustrated in FIGURES 1 and 4.

FIGURE 10 illustrates a pull rod 30c which is formed with a rectangular or square configuration in cross-section. The zones 136 and 137 adjacent the edges of the blank from which the pull rod is formed are normally slightly spaced as shown. The resiliency inherent in the metal exerts outward bias or force to maintain the pull rod in proper, snug engagement with portion 102 of the supporting bracket 50. In this form, the four corners of the cross-sectional configuration indicatd at 138 are curved and provide four contacting points or zones with the supporting bracket. The teeth 45 are of the same shape as thos shown in the other forms of pull rod.

FIGURE 11 illustrates a pull rod 30d wherein the metal is formed to a substantially cylindrical cross-sectional configuration. The inherent stress or resiliency in the metal due to the bending or forming operation causes the cylindrical configuration of the pull rod to snugly yet slidably engage the interior of the cylindrical portion 102 of the bracket 50. The edge zones 140 and 141 are normally slightly spaced as shown. The teeth 45 shown in FIGURE 11 are of substantially the same configuration as in the other forms of pull rod construction.

If desired, the meeting edges or edge zones of the pull rod constructions at the cylindrical portion thereof contained within the bracket or coupling member 26 may be welded together as the spring 38 maintains a constant bias between the member 26 and pull rod, preventing relative vibration between these components.

It is apparent, that within the scope of the invention, modifications and different arrangements may be made other than is herein disclosed, and the present disclosure is illustrative merely, the invention comprehending all variations thereof.

I claim:

1. The method of forming a pull rod for brake actuating mechanism including the steps of forming a sheet metal blank having an end portion of greater width than the body portion thereof, partially severing the metal adjacent the edges of the blank at the zone of juncture of the body portion of the blank with the end portion of increased width, punching a series of generally oval-shaped openings in the blank wherein the openings are aligned longitudinally thereof in a single row and spaced to provide connecting portions, and bending the blank about a longitudinal axis with the major axis of the oval-shaped openings normal to the longitudinal bending axis to form an incompletely closed hollow cross-sectional shape for the body portion of the rod, a completely closed cylindrical configuration of the end portion and the connecting portions of the row distorted to provide a series of spaced teeth.

2. The method of forming a pull rod for brake actuating mechanism including the steps of forming a substantially rectangular blank of sheet metal, punching a series of openings elongated transversely of the blank wherein the openings are aligned longitudinally of the blank in a single row providing spaced connecting portions with at least one transversely extending wall of each opening being of concave curvature with respect to its opposing wall, and bending the blank about a longitudinal axis with the major axis of the transversely elongated openings normal to the longitudinal bending axis to form an incompletely closed hollow cross-sectional shape and the connecting portions of the row distorted to provide a series of spaced teeth.

3. The method of forming a pull rod for brake actuating mechanism including the steps of forming a substantially rectangular blank of sheet metal, punching a series of generally oval-shaped openings in the blank wherein the openings are aligned longitudinally of the blank in a single row and spaced to provide connecting portions, and bending the blank about a longitudinal axis with the major axis of the oval-shaped openings normal to the longitudinal bending axis to form an incompletely closed hollow cross-sectional shape and the connecting portions of the row distorted to provide a series of spaced teeth.

4. The method of forming a pull rod for brake actuating mechanism including the steps of forming a sheet metal blank having an end portion of greater width than the body portion thereof, partially severing the metal adjacent the edges of the blank at the zone of juncture of the body portion of the blank with the end portion of increased width, punching a series of transversely elongated openings in the blank wherein the openings are aligned longitudinally thereof in a single row providing connecting portions with at least one wall of each opening being of concave curvature with respect to its opposing wall, and bending the blank about a longitudinal axis with the major axis of the transversely elongated openings normal to the longitudinal bending axis to form an incompletely closed cross-sectional shape for the body portion of the rod, a cylindrical configuration of the end portion and the connecting sections distorted to provide a series of spaced teeth.

References Cited in the file of this patent

UNITED STATES PATENTS

| | | |
|---|---|---|
| 376,702 | Bayer | Jan. 17, 1888 |
| 481,207 | Smith | Aug. 23, 1892 |
| 1,698,891 | Overbury | Jan. 15, 1929 |
| 1,979,963 | Decker et al. | Nov. 6, 1934 |

OTHER REFERENCES

"The Iron Age," vol. 172; Issue 8, published Aug. 20, 1953; pp. 134–135, FIGS. 4–5.